United States Patent

Baldwin, Jr. et al.

[15] 3,699,304

[45] Oct. 17, 1972

[54] ELECTRON BEAM DEFLECTION CONTROL METHOD AND APPARATUS

[72] Inventors: Edwin C. Baldwin, Jr.; Warren R. Wrenner, both of Endicott, N.Y.

[73] Assignee: International Business Machines Corporation, Armonk, N.Y.

[22] Filed: Dec. 15, 1969

[21] Appl. No.: 884,889

[52] U.S. Cl. ..............219/121 EB, 250/49.5, 315/19, 318/568

[51] Int. Cl. ..............................................B23k 15/00

[58] Field of Search ......318/567, 568, 569; 219/121, 219/121 EB, 121 L, 69; 235/92; 250/49.5; 315/9, 10–17, 19

[56] References Cited

UNITED STATES PATENTS

| | | | |
|---|---|---|---|
| 3,140,379 | 7/1964 | Schleich et al. | 219/69 |
| 3,267,250 | 8/1966 | Ullery | 219/121 |
| 3,373,267 | 3/1968 | Swann | 235/92 |
| 3,426,174 | 2/1969 | Graham et al. | 219/121 |
| 3,448,240 | 6/1969 | Steigerwald | 219/121 |
| 3,479,574 | 11/1969 | Kosem | 318/18 |
| 3,519,788 | 7/1970 | Hatzakis | 219/121 |

*Primary Examiner*—J. V. Truhe
*Assistant Examiner*—Robert E. O'Neill
*Attorney*—Hanifin and Jancin and Kenneth P. Johnson

[57] ABSTRACT

Method and apparatus for controlling the deflection of an energy beam to impinge a workpiece with improved accuracy. A computer and interface unit direct the movement of the beam over a master target to learn and record addresses of impingement areas corresponding to those on a workpiece. Differential current flow in two conductive elements is used to determine accurate location of the address. Upon the substitution of a workpiece for the master target, impingement addresses can be selected without additional corrective deflection circuits.

7 Claims, 15 Drawing Figures

INVENTORS
EDWIN C. BALDWIN, JR.
WARREN R. WRENNER
BY K. P. Johnson
ATTORNEY

ADDRESS TABLE

| | X | Y | CORRECTION |
|---|---|---|---|
| | 20 | 30 | – |
| | +1 | 0 | – |
| FIRST SEARCH | – | +1 | – |
| | – | 0 | – |
| | – | –1 | –1 |
| | +2 | –1 | – |
| SECOND SEARCH | – | 0 | – |
| | – | –1 | 0 |
| | – | –2 | – |
| | – | –1 | 0 |

ELECTRON BEAM DEFLECTION CONTROL METHOD AND APPARATUS

BACKGROUND OF THE INVENTION

New applications are continually being found for electron and ion beams as energy sources. Such sources are particularly advantageous where high energy concentration is required on small workpieces. Examples of these applications are cutting, welding, exposing photo-sensitive materials and testing circuit modules. The electron beam is of small diameter so that large currents per unit area can be achieved. This characteristic thus makes it attractive for processing miniature workpieces. One example of unusual accuracy requirements is the generation of printed circuits on miniature substrates. Photo-resist is exposed by a beam which must maintain linearities on the order of a few tenths of a mil per inch of line. This unusual accuracy is dictated in order to avoid short circuits in the high density of circuit lines within the surface confines.

Several applications, however, require beam positioning accuracies that are difficult to achieve because of inherent distortions and errors in converting deflection signals into beam position. These distortions are known in the art as pin cushion, perpendicularity and nonlinearity. Other distortions are caused by defocusing, astigmatism and spot growth. As a result, complex compensation circuits are usually necessary to generate corrective control signals. Even sophisticated correction means are insufficient in some instances to produce the precision needed because of variations in correction circuit parameters with environment and use.

In those manufacturing situations where there are multiple beam processors, each processor requires special adjustment of its compensation circuits to attain the best level of control. When these individual characteristics are corrected for, in conjunction with the changes that occur during operation, the set-up and maintenance time for production becomes disproportionately expensive elements in the manufacturing costs.

Accordingly, a principal object of this invention is to provide a method and apparatus for controlling the deflection of an electron or ion beam so as to enable the attainment of greater precision in positioning the beam on a workpiece.

Another primary object of this invention is to provide a method by which deflection data can be established with relative ease for workpieces while still adhering to rigid positioning specifications.

A further object of this invention is to provide a method and apparatus by which deflection data for a high-energy beam can be learned from a master impingement target for subsequent use as beam control data for a workpiece.

An important object of this invention is to provide apparatus by which accurate deflection data for energy beam impingement on a workpiece is obtained by scanning a master target with the beam being deflected in accordance with a preliminary search pattern to determine the most accurate beam addresses for a workpiece.

Another object of this invention is to provide apparatus for establishing data for deflecting an energy beam to a plurality of impingement areas by scanning a master target and thereafter selectively using data for impingement on only a portion of corresponding areas on a workpiece.

Yet another object of this invention is to provide a method and apparatus for deflecting a high-energy beam with great accuracy which reduces the need for compensation circuits and adjustments.

A still further object is to provide apparatus and method for establishing energy beam deflection signals with variable accuracy according to the requirements of the application.

SUMMARY OF THE INVENTION

The foregoing objects are attained in accordance with the invention by providing a master target situated for impingement thereof by an energy beam in response to stored deflection signals. The master target is formed with predetermined desired areas for beam impingement that correspond to areas of impingement on a workpiece. The beam is deflected to the areas successively in response to stored address signals. For each area the beam deflection signals are checked to find the most appropriate orthogonal beam address to produce impingement. The address is determined by initially deflecting the beam to an area with an approximate address and, if detection criteria are not met, then moving the beam through a search pattern to obtain the best address. The approximate address is modified in an address storage unit with a correction factor and the beam is then advanced to the next area by approximation. The impingement areas of the master target are constructed to allow detection of misaligned impingement.

After the deflection address and correction factors of the desired areas have been recorded, the master target is replaced with a workpiece. The energy beam is then deflected to the selected impingement areas and unblanked. Since the address of each workpiece area has been determined by actual operation of the system, a high degree of accuracy is obtained in positioning the beam. The required compensations for the various distortions have already been taken into account and are included in the stored addresses. This method thus enables the use of an energy beam in applications that require a high degree of accuracy.

A wide range is available in the degree of accuracy used to control the beam. In advancing the beam along the master target pattern, both the size of the increments of beam movement and the frequency of address correction can be optionally selected. For example, incremental advance along a line can be a fraction of a beam diameter or many diameters or the orthogonal address along one axis can be corrected after each or several increments of advance along the other axis. An additional advantage is that of determining corrected addresses for a large number of points on the master target and then unblanking the beam for a portion of the pattern trace on the workpiece to reproduce only selected impingement areas or lines.

The foregoing and other objects, features and advantages of the invention will be apparent from the following more particular description of a preferred embodiment of the invention, as illustrated in the accompanying drawings wherein:

FIG. 2 is a perspective view of a master impingement target for the electron beam as used in FIG. 1;

Figures 1, 6:
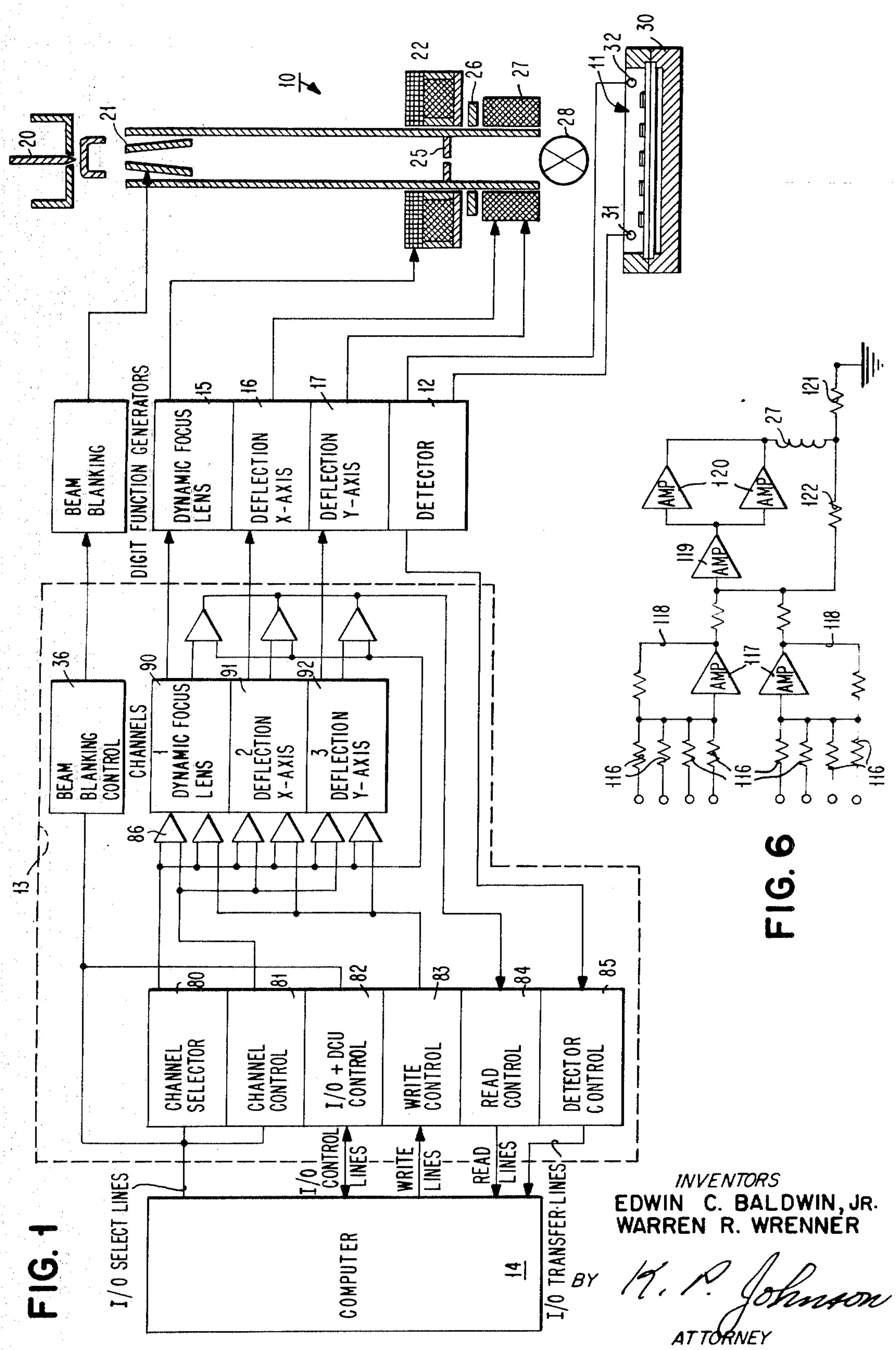
FIG. 1 is a schematic diagram of an electron beam column and control apparatus therefor constructed in accordance with the invention.
Figure 3A:
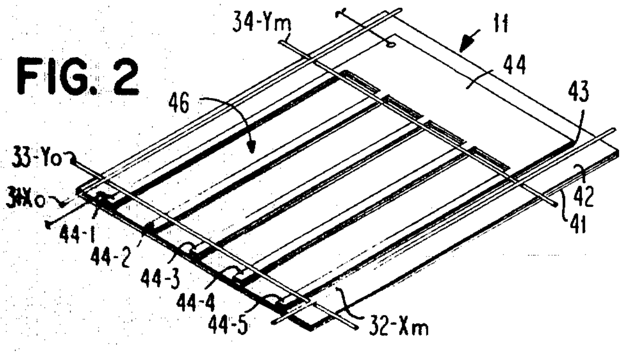
Figure 4A:
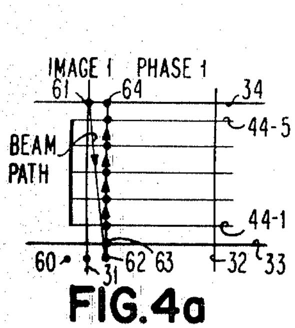
Figure 4B:
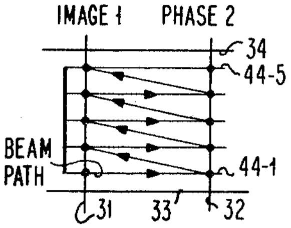
Figure 3B:
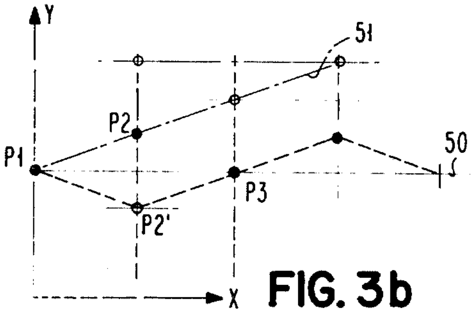
Figure 4C:
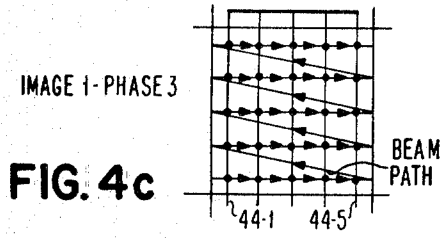
Figure 5:
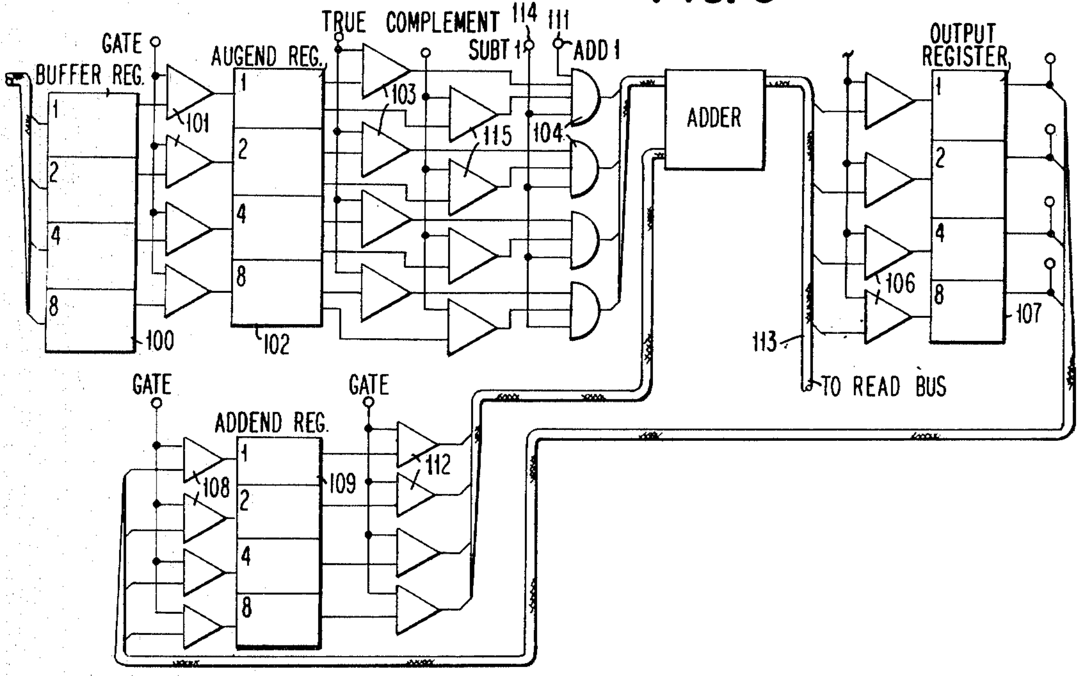
Figure 7A:
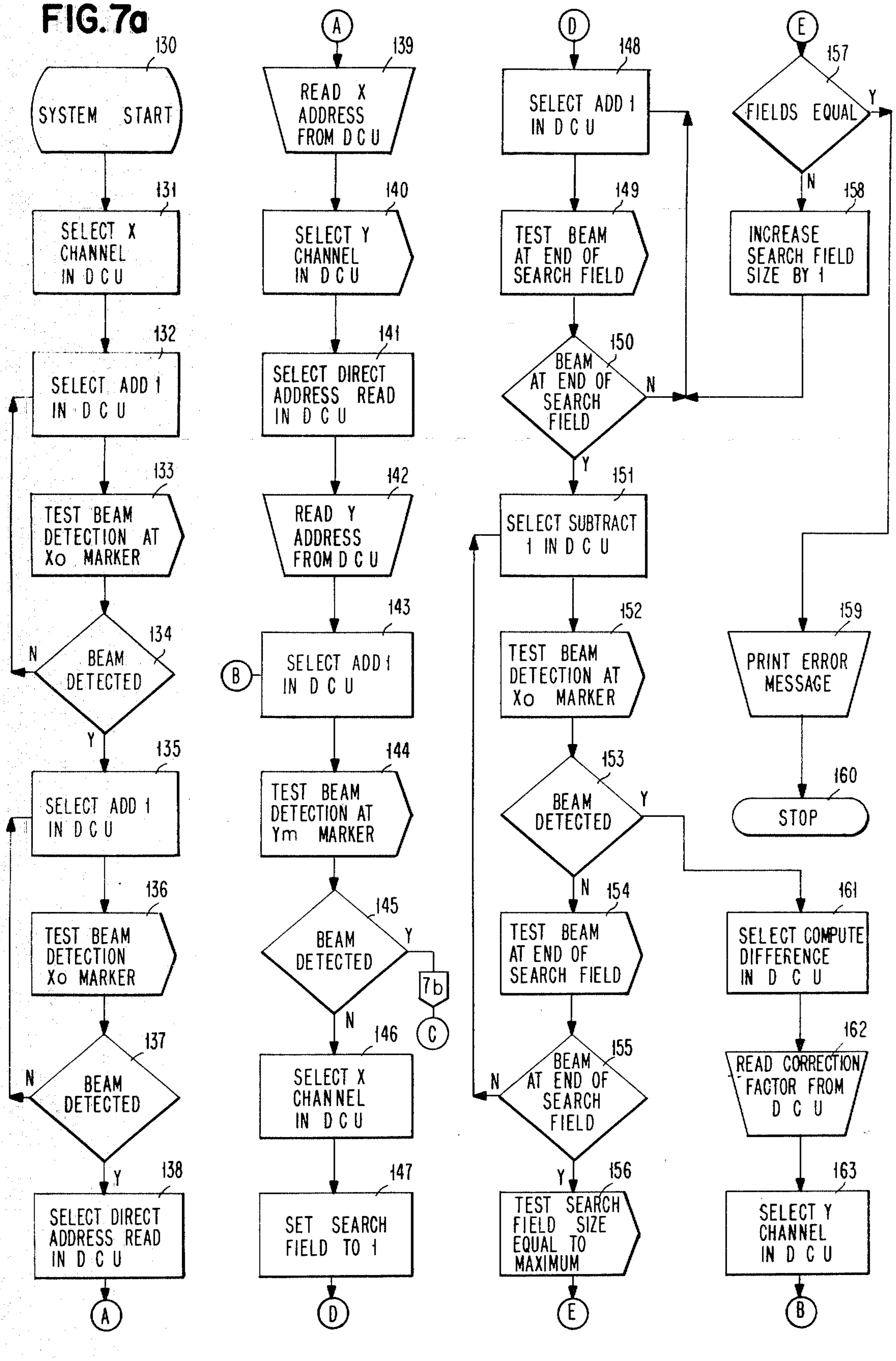
Figure 7B:
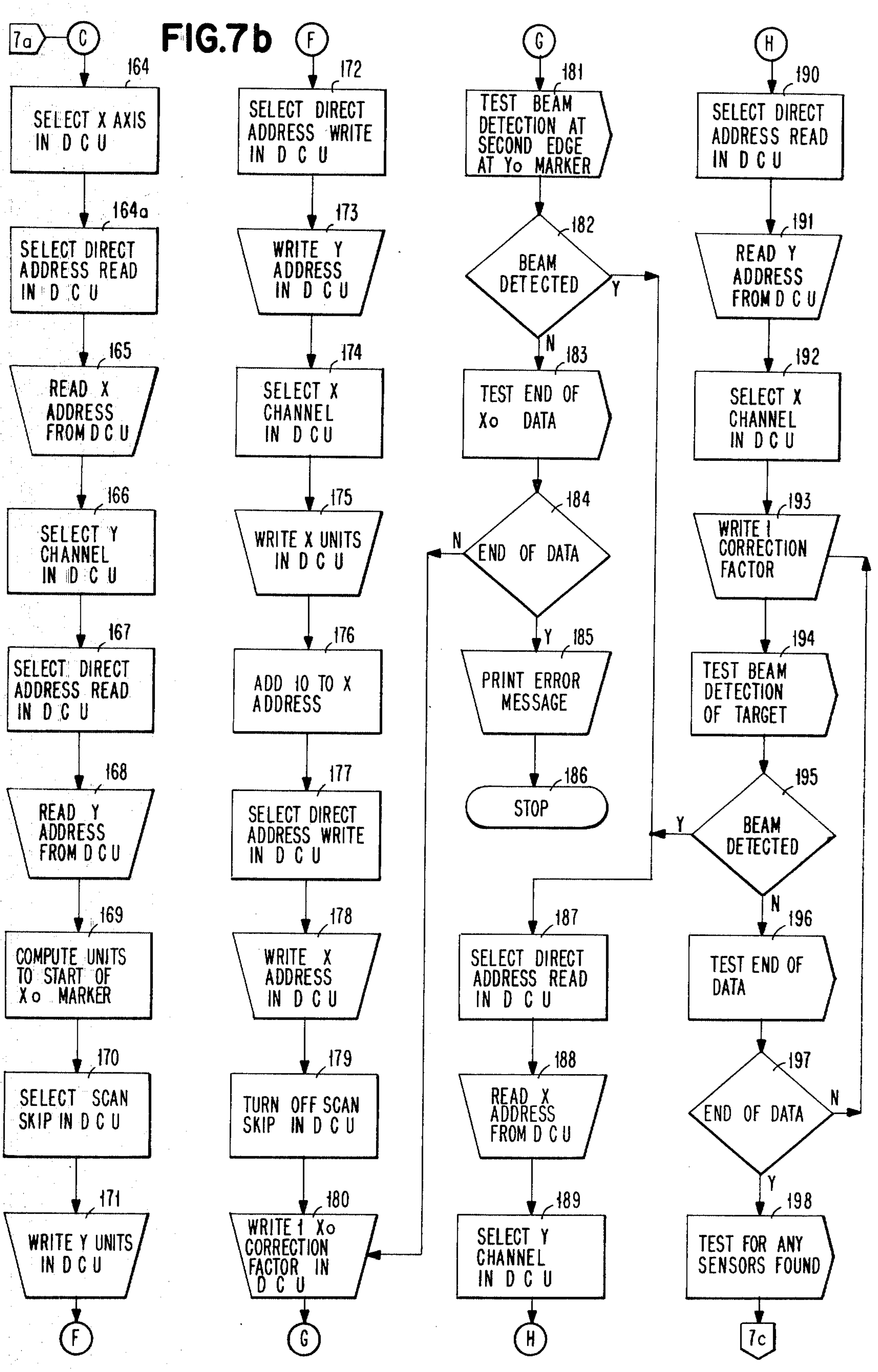
Figure 7C:
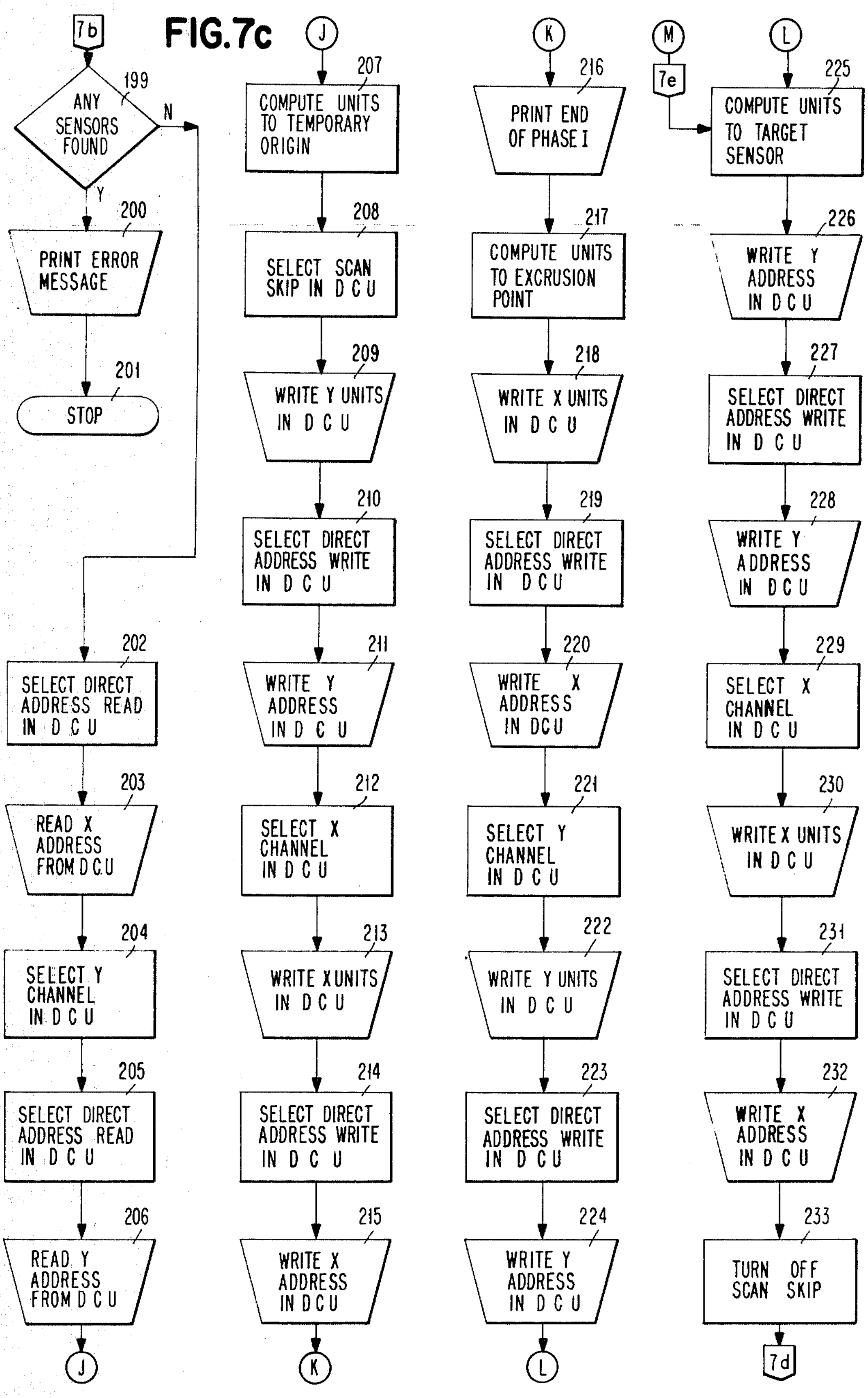
Figure 7D:
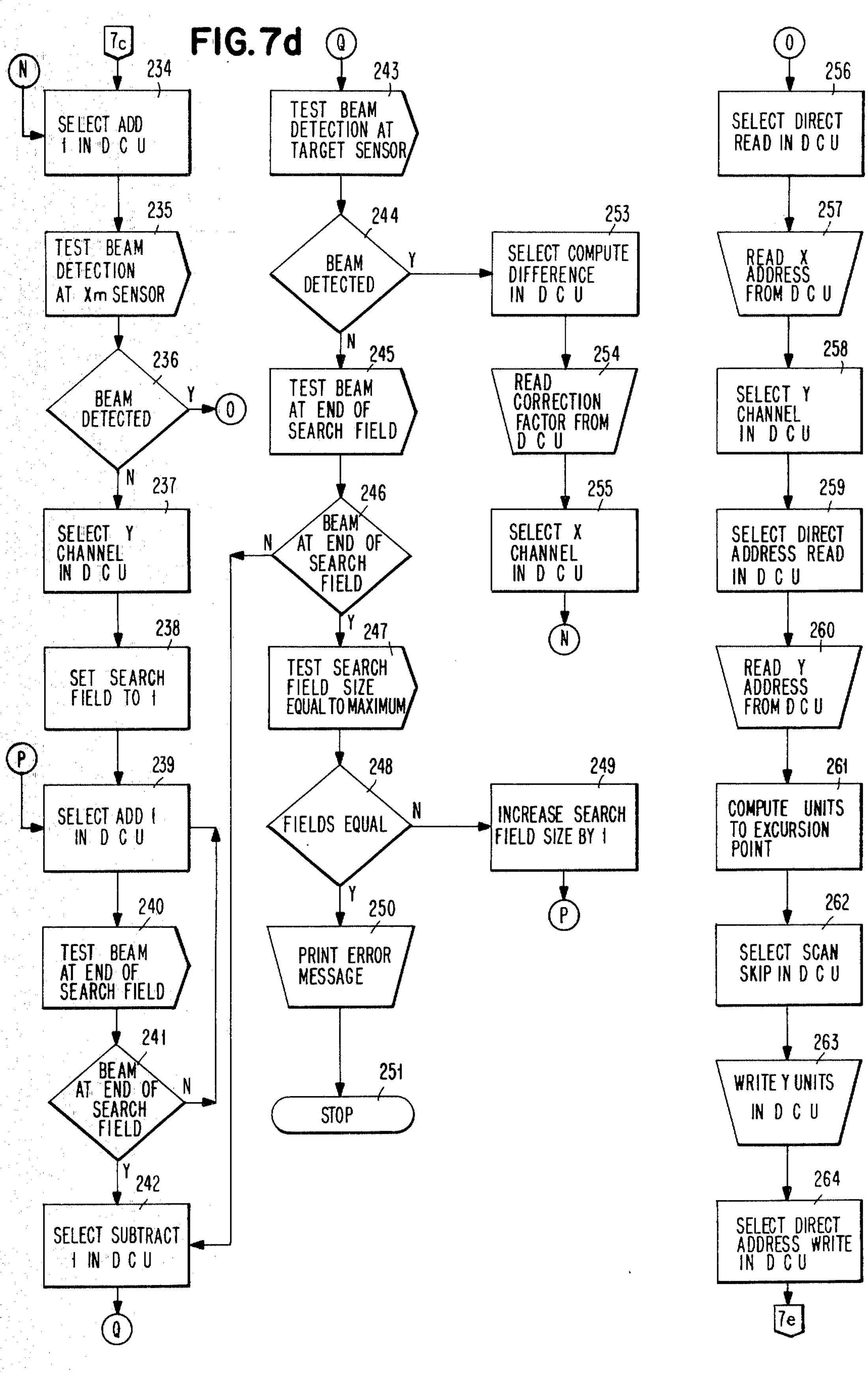
Figure 7E:
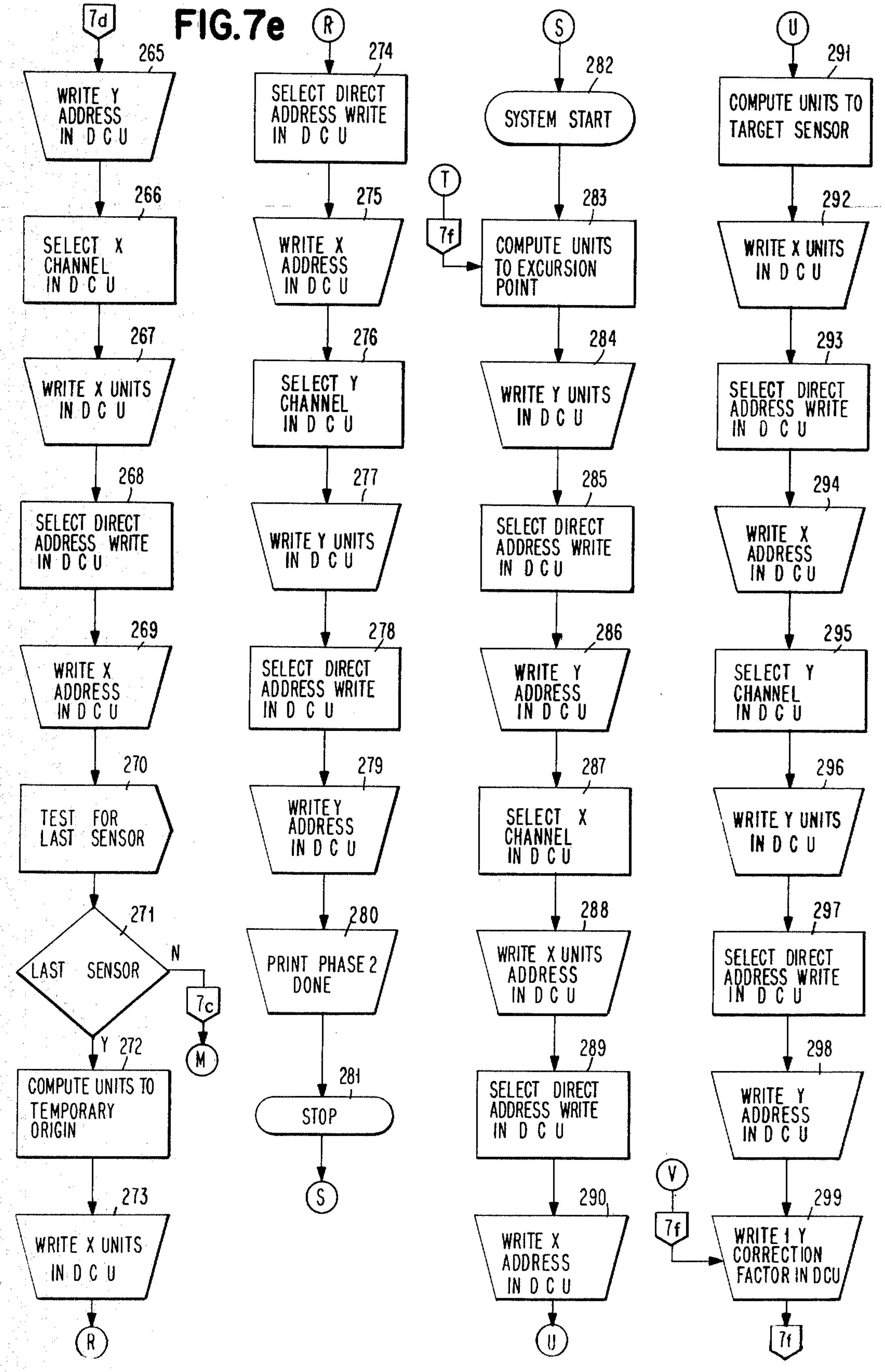
Figure 7F:
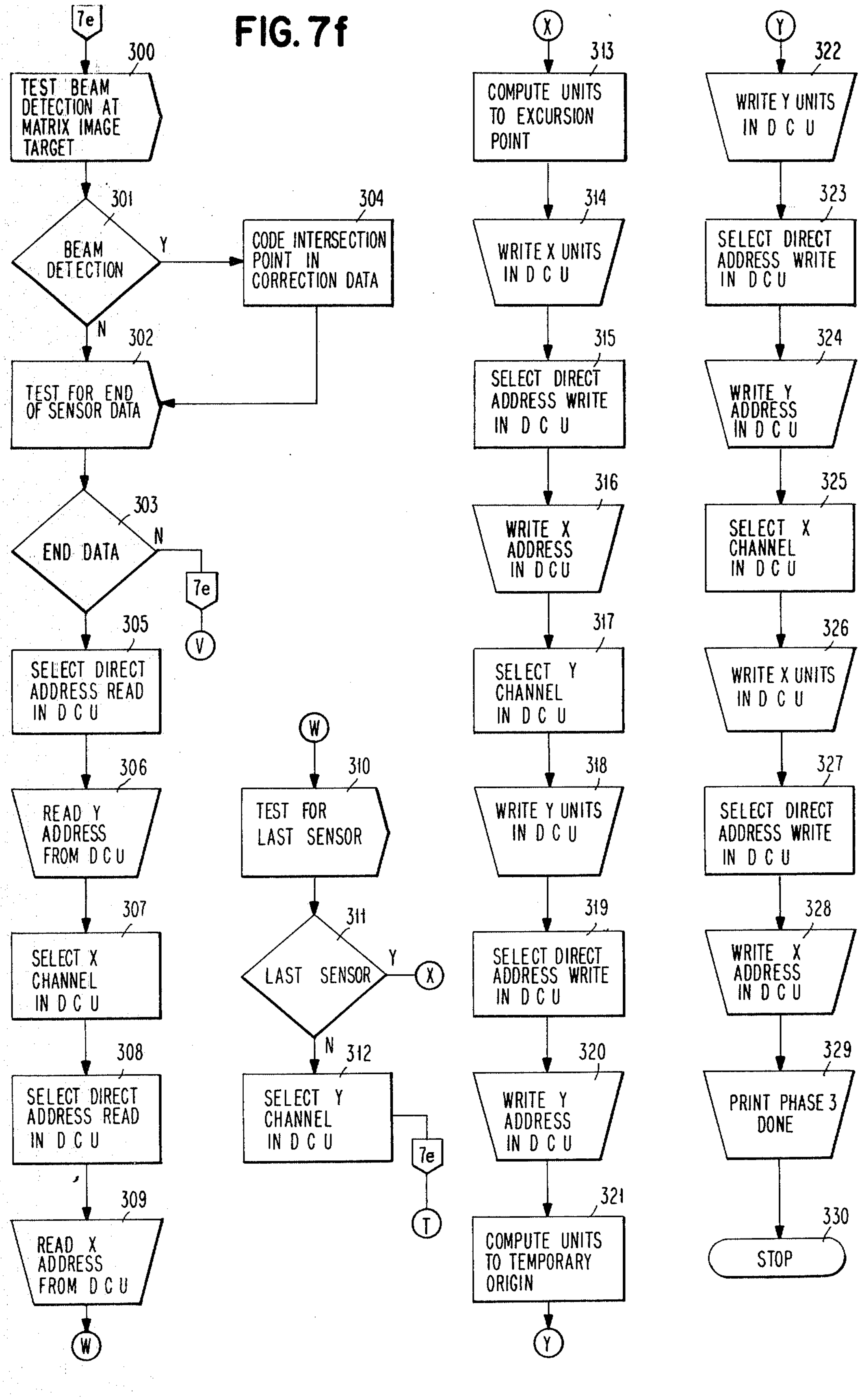

FIGS. 3*a* and 3*b* represent a table of beam deflection current values and diagram of a corresponding beam path on an impingement target;

FIGS. 4*a*, 4*b* and 4*c* are schematic diagrams of the impingement target as scanned by the electron beam in a learning process;

FIG. 5 is a schematic diagram of a data transmission channel for the deflection control unit shown in FIG. 1;

FIG. 6 is an electrical schematic diagram of a digital function generator suitable for use in the invention;

FIGS. 7*a* – 7*f* are a data flow diagram illustrating data handling steps used during an address learning process with the invention.

DESCRIPTION OF THE PREFERRED EMBODIMENT

Referring to FIG. 1, the apparatus for the high energy beam control system of the invention comprises generally an electron optical column 10, an impingement target 11, a detector unit 12, a deflection control unit 13 and general purpose computer 14. The electron optical column is confined within an appropriately evacuated chamber that is accessible for production applications where the impingement targets are workpieces which can be readily inserted and removed.

The major elements of the electron column are an electron gun 20, electrostatic deflection plate 21 for high speed blanking of the beam, an electromagnetic focusing lens 22 having both dynamic and static coils, an aperture plate 25, a stigmator coil 26 and an electromagnetic deflection yoke 27. Additional elements are commonly used to maintain focusing and align the electron beam with the geometric center of the column. After electrons leave the gun they pass between the deflection plates and are brought under the influence of magnetic lens 22. The dynamic focusing coil makes it possible to control the focal length and stigmator coils are used to correct for minor astigmatism. The beam then passes through the electromagnetic deflection yoke 27 and a vacuum lock 28 to impinge on target 11. Although deflection is accomplished here by means of magnetic deflection coils, electrostatic deflection may also be used.

The impingement target is preferably held in a permanent fixture 30 that permits interchangeability of a master target and workpiece with extremely accurate positioning capability. The accuracy used, of course, will depend upon that required for the workpiece. In the case of photo-resist exposure on circuit substrates, the repositioning accuracy required may be on the order of a few microinches.

In order to obtain proper deflection data, the energy beam is directed at target 11 which is a master target shown in more detail in FIG. 2. Still referring to FIG. 1, the target is supported in fixture 30 beneath four conductive field markers 31, 32, 33, 34 which define an enclosed area of concern and aid in determining the beam location. Only two field markers 31, 32 are shown in FIG. 1. Each field marker and the master target are connected to detection circuits of detector unit 12. The detector unit is operable to signal impingement of the beam on any of those elements. A differential detection circuit is used to determine when more than half of the beam current falls on the field markers or master target sensors and the target background, as will be explained subsequently.

Output signals from the detector unit are supplied to a Deflection Control Unit 13 (DCU) which supplies data to and receives data from computer 14. The computer serves principally as a storage device for beam deflection addresses and a suitable computer may be of any of several general purpose digital types such as the Model 1401 of the International Business Machines Corporation. The Deflection Control Unit operates as an interface between the computer and electron column and exercises control over focus and deflection, through the corresponding digital function generators 15, 16, and 17. Beam blanking is performed with Beam Blanking Control Unit 36.

A more detailed description of the elements of Deflection Control Unit 13, their operation and relationships will be given hereinafter following an explanation of the master target and method of detecting impingement and location of the energy beam thereon.

In accordance with the invention, a highly accurate master target is fabricated with conductive and insulative areas and mounted for impingement by the electron beam. The target includes those impingement points for which addresses will be required. An example of a master target is shown in FIG. 2 which is of a design useful in producing location address data with which beam exposure of printed circuit photo-resist can be accomplished. Master target 11 is comprised of a supporting insulative substrate 41, conductive metal layer 42, and conductive layer 44 electrically separated from layer 42 by insulator 43. Conductive layer 44 has a plurality of lines 44–1 through 44–5 formed therein commonly joined at one end. The lines are preferably of a spacing equal to that of the circuit lines on the chips. The line width may be wider than a beam diameter as will become evident hereinafter. Target 11 is supported beneath conductive field markers 31–34, each electrically isolated, as described with reference to FIG. 1. The field markers enclose the area for which beam location addresses are to be determined.

The beam impingement on any field marker 31–34 or master target lines is detected by sensing current flow therein at Detection Unit 12 (FIG. 1). A differential current detector is used to more exactly determine beam location. A balanced flow indicates that the beam impinges approximately equally on both the marker or conductive line and base 42. In other words, the beam address is determined at the edge of a marker or individual conductor 44. When beam current flow is greater in either a conductor or base 42, then appropriate correction can be made in the deflection currents to center the beam on the conductor edge.

Impingement addresses are determined by storing in the computer memory the coordinate addresses or correction factors of all points of interest on the master target. The beam is deflected approximately to each point and then the exact address is found by sensing impingement current and, if necessary, moving the beam through a pre-arranged search path to find the address having the most favorable impingement. This modified address is noted and the correction factor is computed and then stored in the computer for later use.

Referring to FIG. 2, master target 11 and field markers 31–34 are relatively aligned within the supporting fixture so that the target area 46 of interest is enclosed by the field markers. In the absence of any deflection signals, the beam impinges outside area 46 and within the angle subtended by two field markers 31 and 33. This initial positioning is usually done first by optical alignment of the electron column, then by energizing the column without any deflection signal. Field marker 31 represents the coordinate position of zero on the X axis (X*o*) and marker 32 represents the maximum deflection along the X axis (X*m*); in like manner marker 33 identifies the zero position on the Y axis (Y*o*) and marker 34 identifies the maximum deflection along the Y axis (Y*m*).

The basic target-learning philosophy is illustrated in FIGS. 3*a* and 3*b*. In FIG. 3*a*, assume that an X conductor 50 on a master target has its left end at an address of 20 units of X axis current and 30 units of Y axis current which is supplied by the Detection Control Unit to the deflection yoke. The beam is thus positioned at point P1 in FIG. 3*b*. If the beam is then progressively deflected along the conductor in the X direction by merely adding units of deflection current, the beam path would follow the dashed line 51 (shown exaggerated). This inherent tendency is corrected by seeking the proper Y address that will result in positioning the beam closest to the conductor. After the addition of one unit of current for movement in the X direction, the beam will impinge at P2. Note that in FIG. 3*a*, the X address is increased one unit of current and the Y current is unchanged. The beam is now deflected along the Y axis through a prearranged search pattern by the computer and Deflection Control Unit. In FIGS. 3*a* and 3*b* one current unit is added for the Y deflection to move the beam up one increment, then subtracted to return the beam to the original address, then another unit of current is subtracted to move the beam down one increment. This pattern is seen in the change of the Y address in FIG. 3*a* for the first search. During each Y movement of the beam, the differential detector determines the position giving the most nearly equal current flow in conductor 50 and its base. The beam address in this example is determined to be at P2′ so that the Y address for P2 is modified by a minus one correction factor.

The beam is now advanced one current unit farther along the X axis so that, without change in the Y address, the beam impinges at P3. The search pattern of moving the beam in the Y direction up one increment, return, and down one unit is repeated. The address of minus one Y current unit is best as indicted in the second search and the beam is moved again by the next X unit of current. A decision can be made at each Y position because the tolerance in unequal beam currents at conductor 50 and its underlying base can be preset so that additional searching is made only if the difference in beam currents exceeds the allowable tolerance.

If the search pattern of plus one, return, and minus one fails to satisfy the differential beam current detector, then the search area is increased to plus two, plus one, return, minus one, minus two; plus three, plus two, plus one, return, minus one, minus two, minus three and so on until a predetermined limit is reached. If no conductor is then found, a stop signal is generated and investigation is made. With the foregoing procedure, a Y deflection current value can be determined for each added increment of X deflection current so that extremely accurate addresses are possible. If less accuracy is permissible, a Y address can be determined only after the X address has been advanced several increments. The size of the current increments will, of course, have a bearing on the frequency of correction required and the number of program steps required to learn the entire line.

The method of learning corrected addresses for the construction of the master target lines is illustrated in FIGS. 4*a*, 4*b* and 4*c*. The learning process uses three phases for each of two images. Only the learning of one image will be described since that for the second image is a duplication of procedure. FIG. 4*a* represents the first phase of the first image, and FIGS. 4*b* and 4*c* respectively represent the second and third phases for that image.

Assuming the first image is that of X-oriented lines, master target 11 is located with its conductors 44–1 to 44–5 arranged normal to the Y axis and parallel to the X axis as indicated schematically in FIG. 4*a*. The area of interest is bounded by field markers 31–34. Without any applied X or Y deflection current, the beam is aligned to impinge on the target at point 60 within the angle subtended by field marker wires 31 (X*o*) and 33 (Y*o*) outside the area of interest. The Deflection Control Unit is then operated by the computer to add successive increments of X deflection current to move the beam until it falls on the right edge of field marker 31, causing current flow that is detected. Once the beam is on the X*o* marker wire, the Y deflection current is incrementally and successively increased to move the beam along the X*o* field marker until the Ym field marker is encountered at point 61. The purpose of following the X*o* field marker to Y*m* is to find and record beam addresses and correction factors insuring that the beam will move in a straight line normal to the plurality of master target conductors. This deflection will compensate for alignment errors in the deflection coil as it is energized.

The beam is then returned to its starting position at the lower end of the X*o* field marker. The original X address of the beam at the X*o* field marker is increased by several increments to move the beam to the right of the X*o* field marker to point 62. Each of the Y addresses for the X*o* field marker traverse is used again and the beam is deflected toward point 64 at the Ym field marker. The beam follows a path upward adjacent and parallel to the X*o* marker until the Yo marker is detected at point 63. This serves as the temporary origin. Upon continuing the traverse toward point 64, the X and Y address of the first edge encountered for each conductor 44 is stored as it is impinged. After encountering the Ym marker, the beam is returned to the temporary origin 63. The computer memory now has stored the left end starting addresses for each master target conductor 44–1 to 44–5 and the tracing of horizontal conductors for Phase II is to be started.

However, prior to starting Phase II, any residual magnetism in the deflection yoke is swamped out by applying excess current. These excess deflection currents are applied gradually to the yoke to prevent saturation of the digital function generators and are increased until approximately twice that required current for covering the enclosed field has been applied. Thereafter the beam is returned to point 63.

The learning process for Phase II of FIG. **4*b* is similar to the address correction philosophy described with regard to FIGS. 3*a* and 3*b*. The beam is moved to the beginning left end address for the first horizontal conductor 44–1** and incremented in the X direction toward X*m* field marker 32. Beam traversal is again indicated by the arrows. During the horizontal learning deflection, the beam impingement is preferably maintained at the conductor edge. Since the lower edge was the line origin address, it can be used as a starting point. As the X address is incremented regularly, the Y address correction necessary for the best edge positioning will be found by the search pattern and also stored. Horizontal line tracing continues until the Xm field marker 32 is encountered, which signals termination of further storage and starts the application of excess deflection current for swamping the residual magnetism. Thereafter the beam is brought to the left origin of conductor 44–2 where the learning process is repeated for the next line. This procedure is continued until all horizontal lines have been learned to conclude Phase II of the process.

At this point the master target is removed from its holding fixture, rotated through 90°, and relocated in the fixture for Phase III in FIG. **4*c***. During this last phase of Image I, the beam is deflected according to the addresses for the horizontal lines learned in Phase II. Each line learned is retraced from the stored address data. During retracing, however, the X address of each now vertical line is recorded. The third phase is required for the application where selected line segments are to be exposed by the beam in photo-resist. Since the horizontal deflection of the beam is not linear, the actual addresses of intersection points must be learned to produce line segments of known length. The beam path is again indicated by the arrows. With the address data stored up to this point, it is possible to trace horizontal lines and to deflect the beam to the ends of line segments.

Image II or the vertical lines must now be learned. This is done in the same manner as that just described for Image I. The difference is that the master target is oriented so that the conductors **44*a*–44*e*** are vertical during Phases I and II and horizontal for Phase III. When the second image is learned, the stored address data is then sufficient to trace lines or segments along either the horizontal or vertical axis. Segments are easily traced by unblanking the beam only where desired during the trace of an entire line. Accuracy of line reproduction is best accomplished by performing all segments along one axis before doing those along the other axis because of the retention of residual magnetism.

The target learning process is accomplished principally through the programming of computer 14 for operation in response to the signals from detector unit 12. Deflection Control Unit (DCU) 13 serves as an interface between the computer and digital function generators 15 – 17 which do the actual controlling of beam location and size by supplying the proper currents. The computer is provided with a plurality of typical input/output (I/O) selection and control lines over which the computer and DCU mutually respond to inquiry and data transmission signals. Channel Selector unit 80, Channel Control unit 81 and I/O - DCU Control Unit 82 each serve a gating function for determining when stored data is to be written or read on transmission channels of the DCU. The gates are indicated as AND circuits 86. Data is transferred via a selected channel 90 – 92 in the DCU to a corresponding digital function generator 15 – 17. Each control function such as focus and deflection is assigned a channel over which it receives its signals in digital values. Both the channel elements and digital function generating elements will be described subsequently.

Data from the field markers 31 – 34 and the detector circuits 12 are transmitted to the DCU interface for the computer to test directly and allow rapid response to beam location signals. These signals, of course, indicate the termination and continuation of various program steps in the learning process.

Channel Selector unit 80 functions as a control device to pick the proper one of DCU channels 90 – 92 (FIG. 1) to receive data from or transmit data to the computer. The desired channel is selected merely by gating the channel input with coded logic signals. A channel is chosen, of course, according to the function to be carried out as indicated by the name on channels 90 – 92. In this case, one of three channels is selected.

A channel, once selected, requires various control signals which must be applied at the proper time and in the right sequence. The Channel Control unit provides these operational signals to the already selected channel from the computer to enable the channel to perform its assigned function. Examples of these signals are the following: add or subtract one during beam incrementing or decrementing in the search pattern; compute the difference between the present and new addresses when learning a line; and instructing the computer to write addresses in or read addresses from registers within the selected control channels.

In addition to selecting a channel and supplying the computer signal for channel operation, there are other functions that are necessary for both computer and DCU operation. The I/O & DCU Control unit 82 provides and directs the appropriate signals. Examples of these signals are the following: (1) inhibit scan signal which stops the application of additional deflection currents to one axis as the other axis continues to receive more deflection currents to perform swamping excursions; (2) beam on/off signals during movement of the beam and impingement detection, so that the beam is on only after the deflection currents have been applied to avoid burning and compensate for delays through the deflection circuits; (3) beam on/off signals during workpiece exposure to avoid overexposed areas; (4) optional signals to allow data packing or condensing by enabling the computer to eliminate zero correction factors and conserve storage; (5) clock timing signals; (6) signals calling for reading and writing by the computer; (7) and service requests and response signals between units. I/O & DCU Control unit 82 applies these communication signals between the computer and DCU channels, and determines the sequence in which the signals will be provided.

Write Control and Read Control units 83 and 84 operate as gates for transmission of data from and to the computer, being governed by the signals from preceding units 80 – 82. Data being written is transmitted to the already selected channel, and data being read is transmitted to the computer for storage after being determined. Detector Control Unit 85 serves as a buffer storage unit for indicating beam incidence on field markers or master target. This data is constantly available to the computer.

A brief description of the apparatus contained within a DCU channel will be made with reference to FIG. 5. The channels are not identical but are similar. Differences occur in the way final data must be determined or presented to the computer. The structural arrangement shown in the figure is that of either the X or Y deflection axis for determining the addresses to be stored indicating the start of a conductive line or correction factors. Address data from the computer storage is transferred to binary stages of Buffer Register 100 and gated through AND circuits 101 to the Augend Register 102 upon appropriate timing signals from channel control unit 81. Each register has been represented by only four binary stages, 1, 2, 4 and 8 although several more stages are used. When deflecting the beam to an initial starting point for a scan, the augend address is gated in true form through AND circuits 103 and OR circuits 104 into Adder 105. No addition is performed at this time so that the address values are further gated through AND circuits 106 into the Output Register 107. These values are supplied to the digital function generators 15 – 17 (FIG. 1) and through further gates 108 to Addend Register 109.

In performing the learning process for Phase I of Image I or II, the address is increased by increments of one via the Add line 111 to move the beam appropriately along an axis. This produces successive pulses at OR 104 of the first binary stage so that the address for that axis increases correspondingly at the Output Register 107 and Addend Register 109. When incrementally advancing the beam, the augend address is blocked and the addend data appears from AND gates 112 at the Adder each time to receive the Add one pulse. Subtraction is done by forcing the two's complement of one at each binary stage of the input to the Adder for complement addition. Each time a conductive line is encountered on the master target, the value from the Adder at that time is gated into the computer storage on Read Bus 113. Augend Register data, which retains the initial address value is blocked so that only the latest address is read.

When performing the learning process of Phase II for either image, the starting address for a line is transmitted to the Buffer Register 100 from the computer and transferred in true form to the remaining registers prior to beginning the line learning. Assuming that the channel of FIG. 5 is to produce correction factors rather than regular advancing increments, there must be a subtraction process to determine the value of a correction factor. With each incremental advance of the opposite axis channel, the present addend address at the Adder is operated on by either adding one or subtracting one with pulses on Add line 111 or Subtract line 114. Through control of gates 106, 108 and 112, each change in the address is reflected at the Output Register 107, Addend Register 109 and Adder 105. The search program of the computer controls the activation of the addition and subtraction lines to develop the search pattern for the beam.

When a proper address is found by detecting the master conductor edge, then subtraction occurs between the values of the initial augend address and present addend address. Subtraction is done by a complement addition so that the complement AND gates 115 are conditioned to supply the complement values to Adder 105. To this is added the addend address value via AND 112 so that the correction factor is produced. The correction factor is placed in two's complement form by adding one to the correction factor prior to presenting it to the Read Bus 113 for transmission to the computer. The augend address does not change from its starting value and is transferred to the Adder, Output and Addend Registers after each correction factor is determined to serve as a starting address for the next correction search pattern. Correction factors are stored in the computer only as plus or minus some small value each corresponding to an address value along the opposite axis. This method is not required but is preferred because less storage capacity is needed.

When the beam impinges upon a crossing conductor or field marker, this fact, of course, is indicated by the detection circuits. Among other uses, such detection at times causes the computer to institute its program steps for a deflection current swamping excursion. Impingement causes the computer to calculate the difference between the number of increments required for the excursion and that presently indicated as an address. A determination is then made of the number of large current units in which the excursion can be accomplished without saturating the digital function generators. These steps are each equivalent to several of those current increments used for learning the target in order to make the excursion in a minimum of time. Return from the excursion point to the next starting point is also made by using the large current units.

The digital value in Output Register 107 is applied through a digital function generator for the control purpose assigned to its channel such as deflection or focus correction. These generators are designated 15 – 17 in FIG. 1. One type of digital function generator operable in the invention is shown schematically in FIG. 6. This is an ultra stable digital-to-analog converter. Each digital register stage of output register 107 (FIG. 5) is connected to a resistor 116 having a resistance value to allow current flow in proportion to the digital value of the respective stage. To accommodate the large number of stages the resistors may be grouped to supply input summation signals to operational amplifiers 117, each stabilized with a feedback loop 118. These amplifier output signals are combined at a single stabilized amplifier 119 which, in turn, controls one or more parallel buffer current amplifiers 120. Their output currents are supplied to one of the deflection coils 27 that is connected to ground through resistor 121. A feedback loop including resistor 122 is connected between resistor 121 and the input to amplifier 119.

Focus control over the energy beam is exercised by computer alteration of the digital value of focus current to be applied by digital function generator 15 via channel 90 in the DCU (FIG. 1). Upon completing the learning of both target images, the beam is deflected to selected areas of the target and passed transversely back and forth over a conductive line to determine change in detected current with movement of the beam onto the conductor. The rate of current change reveals the spot size so that adjustments can be made in focusing current. Adjusted digital values are read and stored in the computer for each location tested, and become part of the address data. When the beam reaches the respective addresses during exposure of a workpiece, the focus current is thus controlled at location to maintain the desired spot size.

DESCRIPTION OF DATA FLOW

FIGS. *7a* through *7f* illustrate the flow of data and control signals by which the target learning process is accomplished. This summary data flow chart is only for beam deflection. From the steps shown in these figures, a program can readily be devised to do necessary computations and transfer data within the general purpose digital computer and to transfer data between the computer and Deflection Control Unit (DCU). The type of required operational step in the flow of data is indicated generally by the shape of the box used for the step. For example, in FIG. *7a*, box 130 indicates a keying operation, box 131 indicates a processing annotation or control signal transmission with a unit outside the computer, box 133 indicates a program modification or that an option in program steps lies ahead, box 134 indicates a decision step, box 139 indicates data transmission between the computer and a data input or output unit, and box 160 indicates a terminal unit. Encircled identical letters indicate connections in the diagrams, and the pentagonal enclosures indicate off-sheet connections. In the following description of FIGS. *7a* – *7f*, reference will also be made to FIGS. *4a* - *4c* to illustrate the relationship between the data flow diagrams and beam location.

With reference to FIG. *7a* and FIG. *4a*, an operator initiates the learning process at step 130 by a keying operation. The beam has already been manually aligned and lies between field markers X*o* and Y*o* outside the field of interest on the target. The computer at step 131 first selects the X channel in the DCU and then the Add 1 line for that channel at step 132. This operation moves the beam one increment toward the right along the X axis toward field marker X*o*. At step 133 a test is made for beam impingement on the field marker and a decision is made at step 134, with N indicating no and Y indicating yes at the step. If the marker is not detected, steps 132, 133 and 134 are repeated until impingement is noted. The impingement is detected at the left edge of the X*o* field marker and has to be moved across the marker. This is done at steps 135, 136 and 137, which are repeated as necessary until the beam impingement is at the right edge of the X*o* field marker. When the X*o* field marker edge is found, steps 138 and 139 are taken to store the X address for that point.

At this time, the beam is to learn the addresses of points making up the X*o* field marker along its right edge. The Y channel in the DCU is selected and the existing Y address is stored at steps 140 - 142 even though the Y address is currently zero. Learning begins by moving the beam toward the Ym field marker by single increments and testing for impingement after each movement as indicated by steps 143 - 145. At step 145, if the beam is not detected at Ym, a search is instituted by moving the beam back and forth in the X direction to find the right edge of the Xo marker. The distance to the Ym marker will require many increments of advance and the X*o* marker may not be parallel to the beam movement in the Y direction. Therefore, an X correction factor may be required for each unit of Y advance.

The search pattern is initiated at step 146 by selecting the X channel and at 147 by setting the search field limit to one increment of movement in either direction. Thus, at step 148, one increment is added to the X deflection channel and at step 149 a test is made to determine whether the beam is at the limit of its search field. If the beam is at the field size limit, one increment is subtracted at step 150 and a test for beam detection is made at steps 151 – 153. If the beam is not detected, a test is made for the beam being at the end of the search field at steps 154 - 155 and, if not, steps 151 through 155 are repeated until the subtractions bring the beam to the field marker edge or end of search field. Assuming the marker edge is not found at the end of the search field, steps 156 – 158 are executed to enlarge the search field. These steps issue the command to enlarge the search area by one increment if the preset maximum field size has not been encountered. This control is entered at step 148 and the process of steps 149 through 155 is repeated. Note that increments are added to the search field by repeating steps 148 – 150 until a limit is reached. Testing for beam detection is done only after subtracting an increment and not in adding to move the beam out to the edge of the field. Steps 159 and 160 are activated if the beam is undetected after the maximum search field size has been encountered.

When the beam is detected at step 153, indicating an X-axis correction is required for the corresponding Y increment of address, steps 161 - 162 are utilized to obtain and store the proper correction factor. After storing the correction factor, step 163 is executed and a sequence of operations at step 143 is started again. This repetition is continued until the beam is detected at the Y*m* field marker at step 145.

Upon reaching the Y*m* field marker, steps 164 – 168 of FIG. *7b* are executed to store the X and Y addresses where the Y*m* marker was encountered. During steps 169 – 175, the computer calculates the fewest number of return steps to bring the beam back to the start of its climb along the Y axis on the X*o* marker. This is done to reduce the time for return, and the sizes of these steps are determined by the capability of the digital function generators to accept large changes in current flow without saturating. When the computation is complete, the X and Y channels receive successive changes in current values to return the beam.

At step 176 the X address of the returned beam has 10 increments added to move the beam to the right of the Xo field marker preparatory to its second deflection upward along the marker. Its pass this time will be to locate the starting addresses of the target lines 44–1 through 44–5. During steps 177, 178 and 179, the X address having the ten units added is written in the DCU and the Scan Skip control is turned off. With the latter control off, the Y channel will automatically advance one increment each time the X correction factor is written in the X channel. During steps 180 – 184, the beam is advanced upwardly along the Xo marker with one X correction factor after another, testing for detection of the first target line 44–1. If not found after an increment of advance, a test is made to determine whether all correction factors of the first climb have been used and, if not, another correction factor is used at step 180. Should all factors be used without finding a line, steps 185 and 186 indicate an error.

When Yo sensor is detected at step 182, that address will serve as the temporary origin and is, of course, stored in the computer. Storage of the X and Y addresses of the first line encounter is done with steps 187 – 192. After storage, the search process is repeated for the second and succeeding lines as indicated by steps 192 – 197 as done with corresponding steps 180 – 184 earlier. Each time a target line is encountered at step 195, steps 187 – 192 are also repeated to store the beginning address for that line. Eventually all correction factors for the line parallel to the X*o* marker will be exhausted and so indicated at step 197 so that steps 198 and 199 at FIG. 7*c* will be performed. If no lines had been found during the Xo traversal, then an error would be indicated at steps 200 and 201. As long as any X lines had been discovered, the test is satisfied and steps 202 – 206 are performed enabling the computer to find the address where the beam was located as it ran out of correction factor data. This information is required to compute the large steps to return near the temporary origin. The return is accomplished with steps 208 – 215. Note that in each axis the return steps are written to get near the temporary origin address and the exact address is thereafter written in the DCU. This results in reaching step 216 which is the end of Phase I in learning as shown in FIG. 4*a*.

At this time the deflection coils are supplied with swamping current to move the beam on its excursion beyond the target are. Steps 217 – 224 compute and apply the proper addresses to move the beam through its excursion. Steps 225 – 233 return the beam from its far excursions point to the origin of the first target line 44–1 on FIG. 4*b*. This is done as usual first executing the large steps to move the beam and then the exact address for each axis.

With the beam at the left end of line sensor 44–1, Phase II is started in which the beam is to determine the addresses of that and the remaining lines. Scan Skip is turned off at step 233 and one is added to the X address at step 234 of FIG. 7d, moving the beam an increment toward the right. Step 235 is a test for sensing the field marker X*m*. When not detected at step 236, the Y channel is selected and a search field is set up at steps 237 – 239 being limited at first to one increment. The movement of the beam in the search pattern with steps 238 – 249 and 253 – 255 corresponds with similar steps 147 – 158 described above. In the present instance, the Y address is varied while in the earlier description the beam varied along the X axis. When the beam is detected on the target line edge during the search at step 244, the proper correction factor is read from the DCU into computer storage and the X channel is selected at step 255 for advance to the next increment at prior step 234. The ensuing search pattern is the same as that for the preceding increment and another Y correction factor is determined for the second X increment. This procedure is repeated until the Xm in field marker is detected at step 236, which indicates that the beam has reached the right end of the first target line 44–1 in FIG. 4*b*. When this occurs, the X and Y addresses are read from the DCU into the computer with steps 256 – 260. The computer then calculates the units of deflection for deflection coil swamping excursion and applies units of the proper magnitude with steps 261 – 269 of FIG. 7*e*. At steps 270 – 271, a test is made for the last X target line. If the line just learned is not the last during Phase II, then the data flow returns to former step 225. At this point, the beam is returned from its excursion location to the origin of the next target line to be learned. The steps following 225 are repeated for each target conductor until the last line has been reached.

When the test at step 271 indicates that the last target line has been learned, steps 272 – 279 are executed to return the beam to the temporary origin and being Phase II to completion at steps 280 and 281. At this point, the target is rotated 90° in its holder. An operator changes the target in its fixture and keys the system to initiate the start of Phase III in which the addresses are determined for intersections between the already-learned X lines and now vertical Y lines on the target. Upon starting, steps 283 – 290 are executed for the swamping excursion and steps 291 – 298 are performed to return the beam from the excursion point to the starting address of one of the X lines just learned in Phase II. At step 299, a Y correction factor is fed into the Y channel of the DCU along with an automatically applied corresponding X increment. The beam thus moves to its first learned position along the X axis. No line is present, however, since the target has been rotated. A test is made for beam detection at this point by steps 300 and 301 in FIG. 7*f*. If not detected, a further test is made at steps 302 – 303 for end of correction data and, since it has not been exhausted, step 299 and the following sequence is repeated to move the beam to the next learned increment on the X axis.

After several successive steps along the learned line, a Y-oriented conductive line will be encountered at step 301. This actuates step 304 which inserts a code letter in the recorded list of Y correction factors for the line being traversed. The code letter merely notes the location of a crossing Y line. After notation, steps 302 and 303 are resumed and the beam continues to the next intersection in the same manner as before. Upon sensing the end of correction factor data for a line at step 303, steps 305 – 309 are performed to record the address at the line termination point. Steps 310 – 311 test for completion of the last of the several learned X lines and if not the last, a return is made to step 283 via step 312 for the swamping excursion. Beam return from the excursion point to the starting address of the next learned X line occurs at steps 291 – 298. Intersection learning then starts for the next line at step 299.

When the Y intersections for the last X line have been completed step 311 will so indicate and steps 313 – 320 will be executed for the coil swamping excursion.

Thereafter, steps 321 – 328 are performed to return the beam to the temporary origin earlier noted, and steps 329 and 330 will terminate Phase III. This sequence of operational steps for controlling the beam has been described only for learning X lines and will have to be repeated for the Y lines or Image II. Also this data flow description has been intended merely as a summary of the steps required by a computer in performing the actual control. The actual steps used will vary, of course, with the computer capability and the data manipulation within the computer by the program steps.

From the foregoing description it is evident that the apparatus is not restricted to learning straight or continuous lines. Curved lines can be readily substituted for the illustrated straight lines without altering the compute program or apparatus as long as the line does not have a negative direction, that is, by doubling back on itself. In this instance, such a line can be learned by modifying the computer program to enter a search pattern along either axis upon an incremental advance. Dashed or broken lines require larger search patterns and hence more time to determine impingement area addresses.

In learning the illustrated target of FIG. 2, it will be noted that a substantial accumulation of correction data occurs. Those data can be used by the computer to establish correction values by interpolation for lines not present but parallel to those on the target. This allows construction of a master target with fewer lines while retaining the capability of generating the usual number of lines on a workpiece. The generation of a correction function by computation is particularly advantageous in high quantity production applications such as welding or exposing photoresist.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of establishing precise values for deflection signals to accurately position a beam of charged particles on an impingement area comprising the steps of:

- forming a master target having predetermined areas thereon for impingement by said beam;
- obtaining approximate deflection values for said areas by initially deflecting said beam to impinge a portion of selected ones of said areas and storing said approximate values;
- deflecting said beam from one location to another on said areas in accordance with said stored approximate values of deflection signals for each said area;
- varying said approximate values of deflection signals in a predetermined manner to move said beam through a position of optimum impingement at each said location;
- detecting the optimum incidence of said beam on each said area at each said location;
- obtaining correction values for deflection signals by determining the difference between said approximate values and those values required for deflection to said position of optimum incidence; and
- altering said stored approximate values of deflection signals for each said location with said correction values found to produce said optimum impingement.

2. The method as described in claim 1 wherein said stored values are altered by annexing to said stored values correction values corresponding to said locations.

3. The method as described in claim 1 wherein the magnitude and sign of said correction values for an location are established relative to the corrected deflection signal values for a preceding location.

4. The method described in claim 1 wherein said stored deflection signals for an impingement area are defined by coordinate values along each of two orthogonal axes and said values are varied by incrementing one axis value by uniform amounts while changing the other axis value negatively and positively by differing amounts to find optimum impingement by said beam on a said location along said other axis.

5. The method according to claim 1 further comprising the step of using said stored values and respective correction values to thereafter control the deflection of said beam to corresponding impingement areas on a target other than said master target.

6. A method of accurately controlling the position of impingement of a beam of charged particles on a workpiece which comprises the steps of:

- forming a master target with impingement areas at predetermined locations corresponding to prospective locations of impingement areas of a workpiece;
- obtaining approximate deflection values for said areas by initially deflecting said beam to impinge a portion of selected ones of said areas and storing said approximate values;
- deflecting said beam from one to another of said impingement areas of said master target in accordance with said stored approximate values of deflection signals for each said area;
- varying said stored approximate deflection signal values to change impingement of said beam on said master target areas after deflection thereto according to said approximate values;
- detecting the optimum incidence of said beam on each said area during said change;
- obtaining correction values for deflection signals by determining the difference between said approximate values and those values required for deflection to said position of optimum incidence; and
- altering said stored approximate values with said correction values producing said optimum incidence;
- substituting said workpiece for said master target; and
- deflecting said beam over said work-piece for impingement thereon in accordance with said altered values for said deflection signals.

7. The method as described in claim 6 further including the step of selectively unblanking said beam to produce impingement on fewer areas on said workpiece than were impinged upon said master target.

* * * * *